C. F. Collom's Apparatus for cleaning Ores.

Patented Aug. 29, 1871.

Witnesses
Wm Colborne Brookes
W. C. Friend

C. F. Collom

C. F. Collom's Apparatus for Cleaning Ores.

No. 118,437.    Patented Aug. 29, 1871.

Witnesses.
Wm Colborn Brooks
W. C. Friend

C. F. Collom

C. F. Collom's Apparatus for Cleaning Ores

No. 118,437.  Patented Aug. 29, 1871.

Witnesses
Wm Colborn Brookes
W. C. Friend

C. F. Collom

C. F. Collom's Apparatus for cleaning Ores

No. 118,437. Patented Aug. 29, 1871.

FIG. 9.

Witnesses
W. Colbourn Brookes
W. C. Friend

C. F. Collom

C. F. Collom's Apparatus for Cleaning Ores.

No. 118,437.   FIG. 10.   Patented Aug. 29, 1871.

FIG. 11.

Witnesses-
Wm Colborne Brookes
W. C. Friend

C. F. Collom

C. F. Collom's Apparatus for cleaning Ores.

Patented Aug. 29, 1871.

Witnesses.
Wm Colborn Brookes
W. C. Friend

C. F. Collom

C. F. Collom's Apparatus for cleaning Ores.

Patented Aug. 29, 1871.

Witnesses
Wm Colborne Brookes
W. C. Friend

C. F. Collom

C. F. Collom's Apparatus for Cleaning Ores

Patented Aug. 29, 1871.

FIG. 15.

Witnesses-
Wm Colborne Brookes
W. C. Friend

C. F. Collom

UNITED STATES PATENT OFFICE.

CHARLES FREDERICK COLLOM, OF CALSTOCK, GREAT BRITAIN.

IMPROVEMENT IN APPARATUS FOR DRESSING ORES.

Specification forming part of Letters Patent No. 118,437, dated August 29, 1871.

*To all whom it may concern:*

Be it known that I, CHARLES FREDERICK COLLOM, of Calstock, in the county of Cornwall, in the Kingdom of Great Britain, mining engineer, have invented certain Improvements in Means or Apparatus for Cleaning or Dressing Metallic Ores, of which the following is a specification:

The object of my invention is to save time and labor and at the same time more effectually to cleanse metallic ores. In carrying out my invention I employ a circular table which is so formed that the upper surface of the same shall decline from the center toward the outer circumference equally all round. The table is caused to revolve by means of a shaft or axis, to which it is affixed by arms or other suitable means, and around the inner circumference of the table I arrange a pipe or pipes for the reception of water from a cistern or other source of supply. The pipe or pipes are perforated, and the water from the same runs constantly down the inclined surface of the table. The ore to be operated upon (which has been previously crushed, if required) is fed to the circular table at a point toward the inner circumference or upper part of the incline of the table by means of a "launder" or "chute," supplied with a stream of water, and the ore, after being so deposited on the table, is carried round away from the launder or chute, and while being so carried will be washed or dressed by means of the continual flow of water from the pipe or pipes, and the various particles, according to their specific gravity, will be carried a greater or lesser distance down the inclined table, and thus separated one from the other, while the refuse or "tailings" will be washed over the edge of the table into a suitable receiver or "hutch" placed around the outer circumference of the table. The various qualities of ore may be drawn off by streams of water supplied from perforated pipes or tubes, or by other suitable means, so arranged as to operate one after the other, the first taking away the ore toward the outer circumference of the table and the others successively taking the ore from nearer the inner or upper surface of the table, and consequently the most valuable ore will be left till last. The point in the distance from the top to the bottom of the incline of the table at which the launder or chute shall deposit the ore on the inclined table will be regulated from time to time according to the size and specific gravity of the particles of ore under operation, and the inclination of the table itself will also be arranged according to the size and specific gravity of the ores to be cleansed or dressed. In place of employing means for removing the ore from the table I in some cases place the axle or shaft of the table at an angle, and by that means obtain a constantly-increasing angle to the inclined table during one-half of the revolution of such table, and by that means I am enabled to get rid of, first, the refuse, and then gradually of the more valuable portions of the ore. According to another modification of my invention, instead of forming the table so that its surface shall decline from the center toward the outer circumference and removing the ore from the outer circumference of the inclined table, I in some cases form such table declined from the outer circumference toward the center, and I remove the ore from the inner circumference, in which case the pipe or pipes for water will be arranged above the inclined table toward the outer circumference. For some cases revolving or stationary brushes may be arranged over the surface of the table in position to turn over or keep in motion the ore under operation. According to another modification the inclined table is divided into two parts, one-half being arranged at one angle while the other is arranged at a different angle, and the pipe for washing of the ore is bent so as to serve the purpose of two pipes. In this case the head or ore on the upper portion is washed off first into a launder or chute and is carried thereby into a receiver or hutch, while the ore on the lower portion of the table is washed afterward into another receiver. The water and the refuse or tailings from the general surface of the table will be washed off into other receivers. When it is required to wash or dress silver or gold I prefer to employ a single table, in the surface of which I form grooves for the reception of mercury. But, that the nature of my invention may be fully understood, I will, by the aid of the accompanying drawing, proceed more fully to describe the same.

In each of the views the same letters of reference are employed to represent corresponding parts whenever they occur.

$a\ a$ is the main framing. $b$ is the main or driving-shaft, to which motion is communicated by means of a steam-engine or other suitable power. $c$ is a pinion affixed on the shaft $c'$, gearing into a pinion, $b^1$, affixed on the shaft $b$, supporting and carrying the circular table $f$, which is so formed that the upper surface of the same shall decline from the center or inner circumference $g$ to the outer circumference $h$ equally all round. The table $f$ is affixed to the shaft $b$ by means of sockets $j$, arms $k$, and stays $k^1$. $l$ is a circular pipe which, by means of the connecting-pipes $m^1$, receives a supply of water from a main pipe or tube, $m$, supplied with water from a cistern or other source of supply. The circular pipe $l$ is perforated on its under side at $l^1$, and the water from the same runs constantly down the inclined surface of the table $f$. The ore to be operated upon, which has been previously crushed, if required, is fed to the circular table $f$ by means of a launder or shoot, $n$, through which a stream of water flows, and the ore, after being so deposited on the table $f$, is carried round away from the launder or chute in the direction of the arrow $o$, and while being so carried will, by means of the continued flow of water from the circular pipe $l$, be washed or dressed, and the various particles of the ore will, according to their specific gravity, be carried a greater or lesser distance down the inclined table $f$, and thus separated from the refuse or tailings, which will be washed over the edge $f^1$ of the table $f$ into the receivers or hutches $p\ p^1$ placed around the outer circumference of the table $f$. $l^1\ l^1$ are stops or disconnections in the circular pipe $l$. $m^2\ m^2$ are taps or valves for the regulation of the supply of water to the various portions of the circular pipe $l$. $g\ g$ are stationary brushes arranged over the surface of the table $f$ in position to turn over and keep in motion the particles of ore under operation. These brushes are retained in position by rods or wires $g^1\ g^1$. $l^4\ l^5$ are pipes or tubes which are perforated on their lower sides $l^6$ and receive water from the circular pipe $l$, and are so arranged as to operate one after the other, the first $l^4$ being perforated from 5 to 6 and taking the ore away from the outer circumference of the table $f$ and washing it into the receiver or hutch S, while the pipe $l^5$ is perforated its whole length and washes the ore from the inner or upper surface of the table $f$, and consequently the most valuable, into the receiver or hutch S′. The pipes $l^4\ l^5$ are formed with a bend, $l^6$, which is furnished with a plug, $l^7$, capable of removal at pleasure, in order that when, by rubbing the hand along over the perforations in those pipes, any dirt in those perforations which has been pressed up into the interior of the pipes, and all impurities contained in the perforations, will be washed away, by removing the plug $l^7$ and allowing the water to flow through the pipe freely. The receivers or hutches $p$ and $p^1$ are found inclined from the point at which they leave their main receiver or hutch S or S′, in order that the water may readily flow away to the outlets $p^2$ and $p^3$. $p^4$ are "hatches" or "stops," which may be used when required to retain any ore or solid matters deposited in the receivers or hutches $p\ p^1$, and they are capable of being raised or lowered at will, to retain a greater or lesser quantity of the matters washed into those receivers, as may be required. L is a drain for the purpose of carrying off any rain or moisture accumulating under the table $f$.

Figure 1:
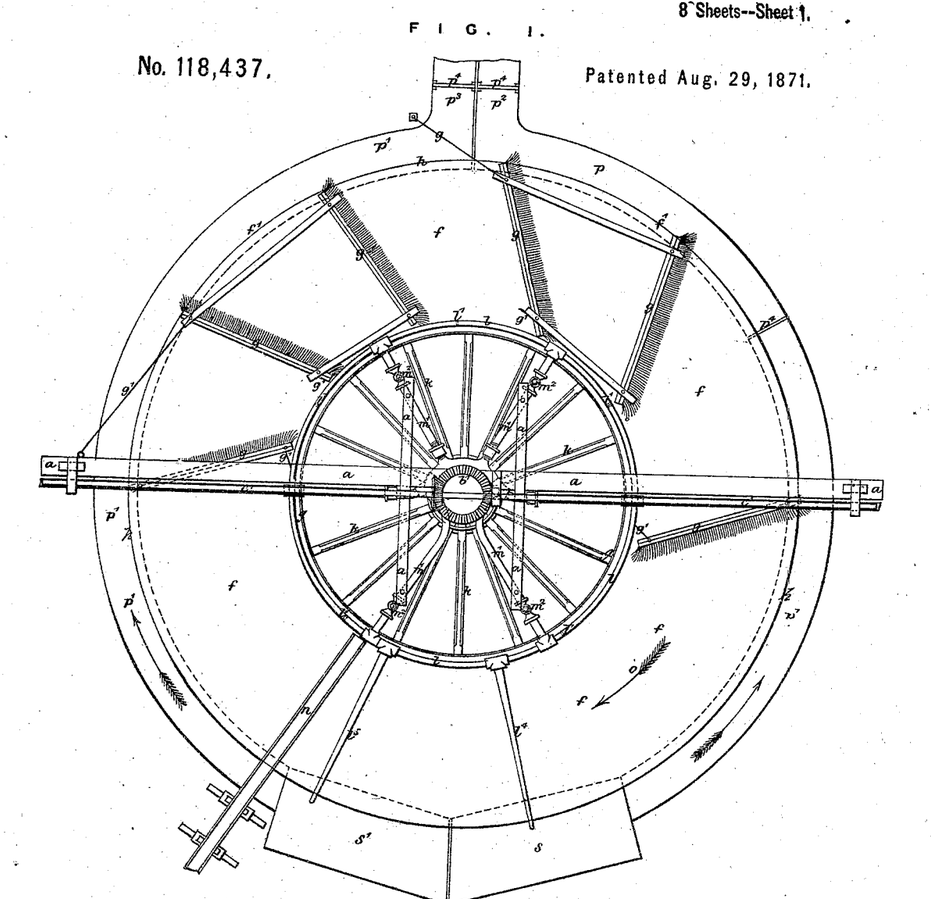
Figure 1 shows a plan.
Figure 2:
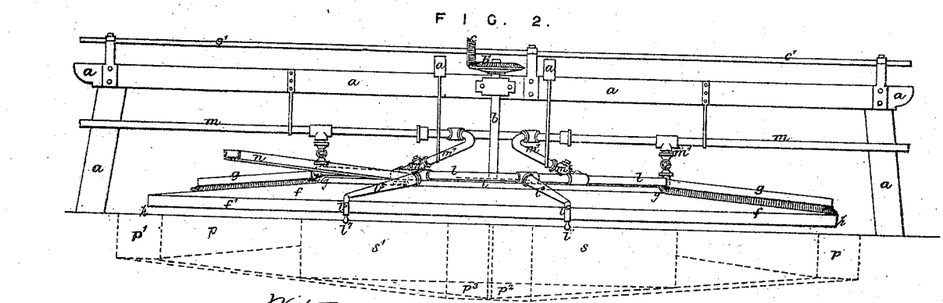
Fig. 2, a side view.
Figure 3:
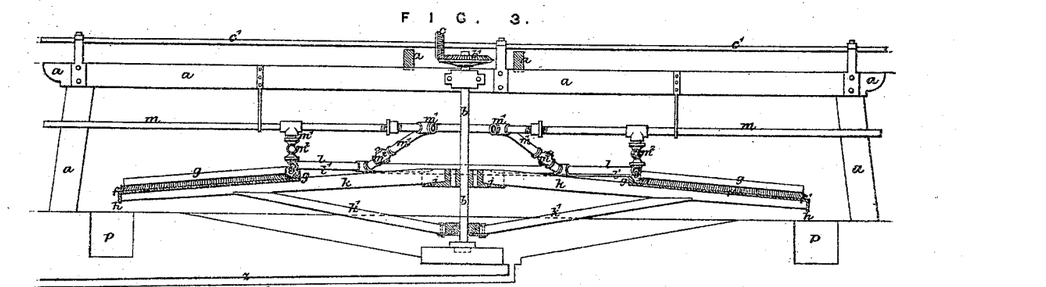
Fig. 3, a section.
Figure 4:
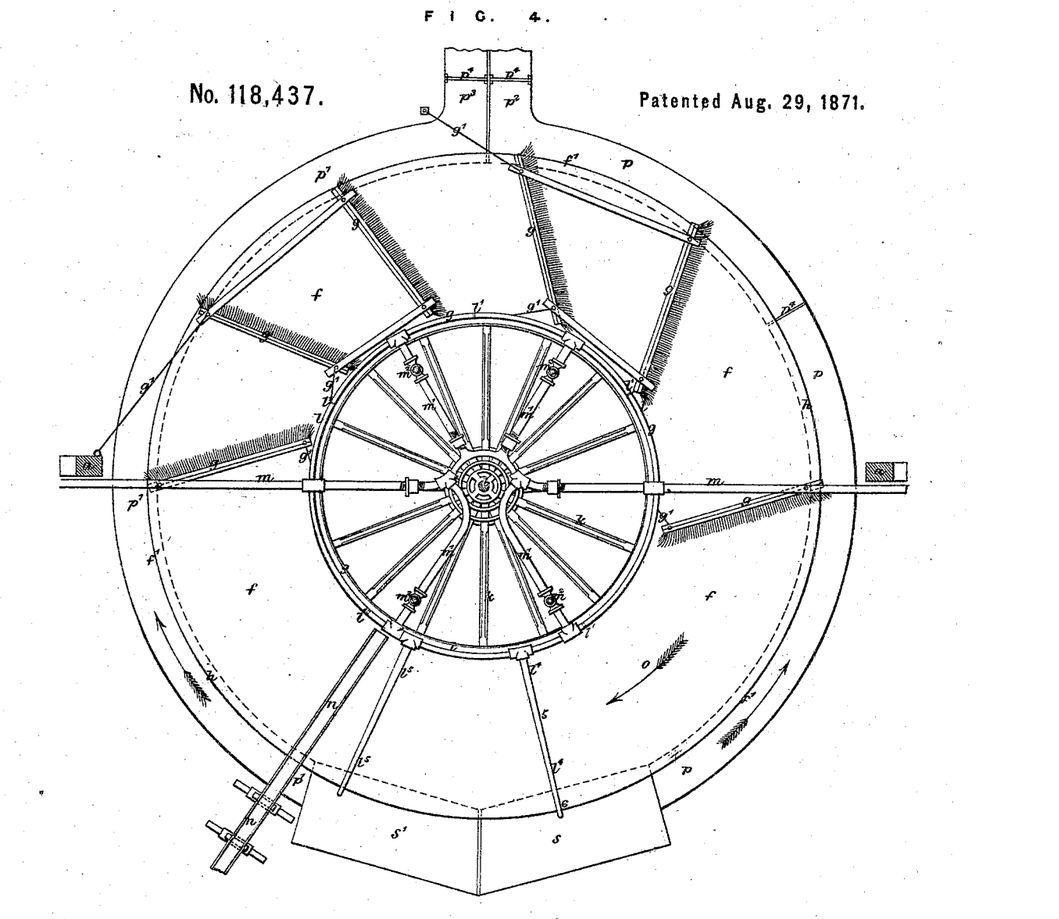
Figs. 4, 5, 6, and 7, detail views of apparatus arranged according to my invention.
Figure 5:
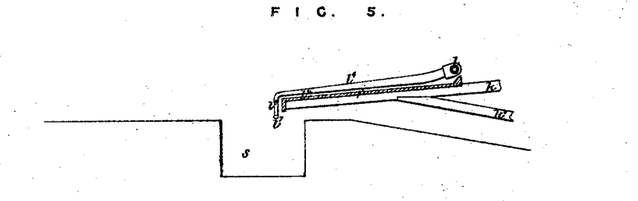
Figure 6:
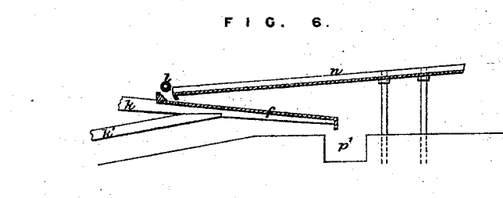
Figure 7:
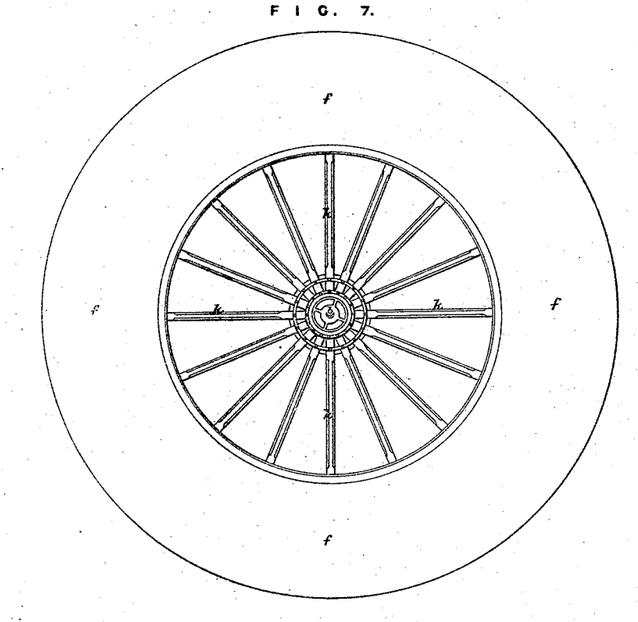
Figure 8:
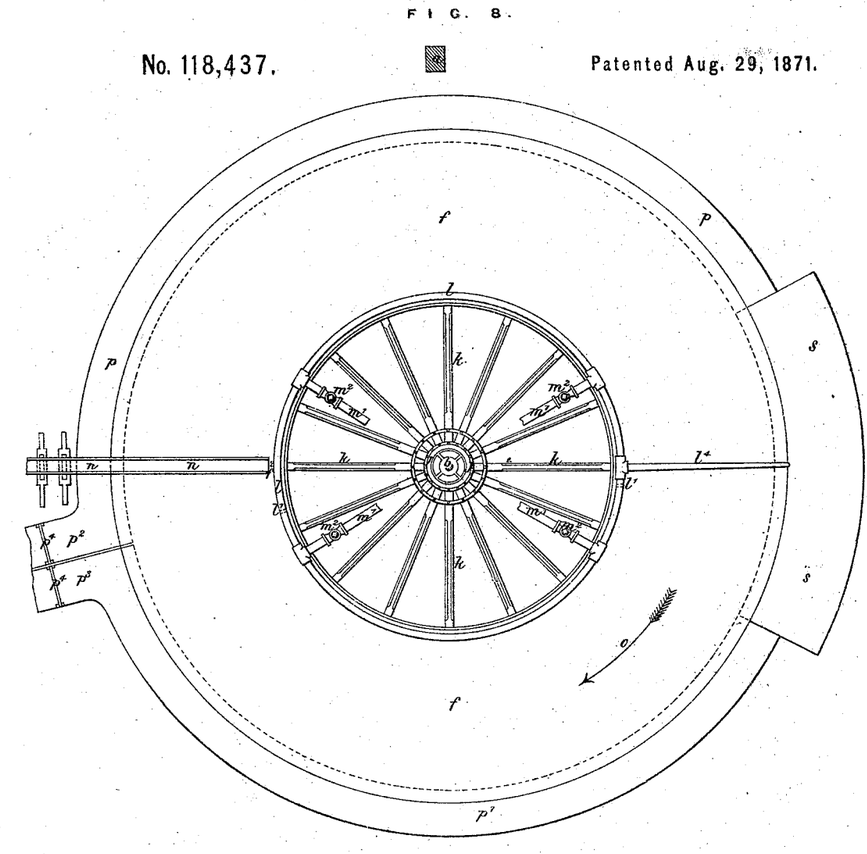
Figure 9:
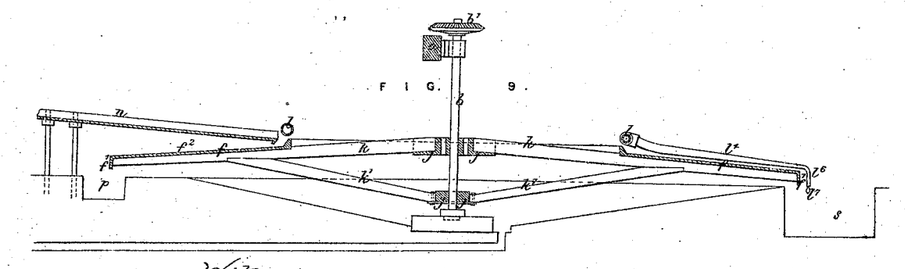

Figs. 8 and 9 show, by plan and sectional views, portion of a table arranged according to another modification of my invention. In this and the following modifications I have only shown so much of the apparatus as will explain the alterations from the apparatus already described. According to this arrangement the axle or shaft $b$ of the table $f$ is arranged to revolve at an angle, by which means a constantly-increasing angle is obtained to the surface of the table $f$ during one-half of its revolution. The ore is fed to the table $f$ by the launder or chute $n$, upper part $f^3$ of the same, where the angle is least, and the ore, after being so deposited, is carried round by the table and washed by means of a stream of water from the circular pipe $l^1$, as in the previous arrangement. $l^4$ is a pipe fixed at the lowest part of the table $f$ for the purpose of washing the ore remaining on the table $f$ into the receiver S. In most cases, however, with this arrangement this pipe may be dispensed with. The water and the refuse or tailings are carried off by means of the circular receivers or hutches $p$ and $p^1$, as in Figs. 1, 2, 3, 4, 5, 6, 7. In this arrangement only one-half of the table will be used at once, and the ore, being deposited at the upper end, is washed off at the lower side of the same.

Figure 10:
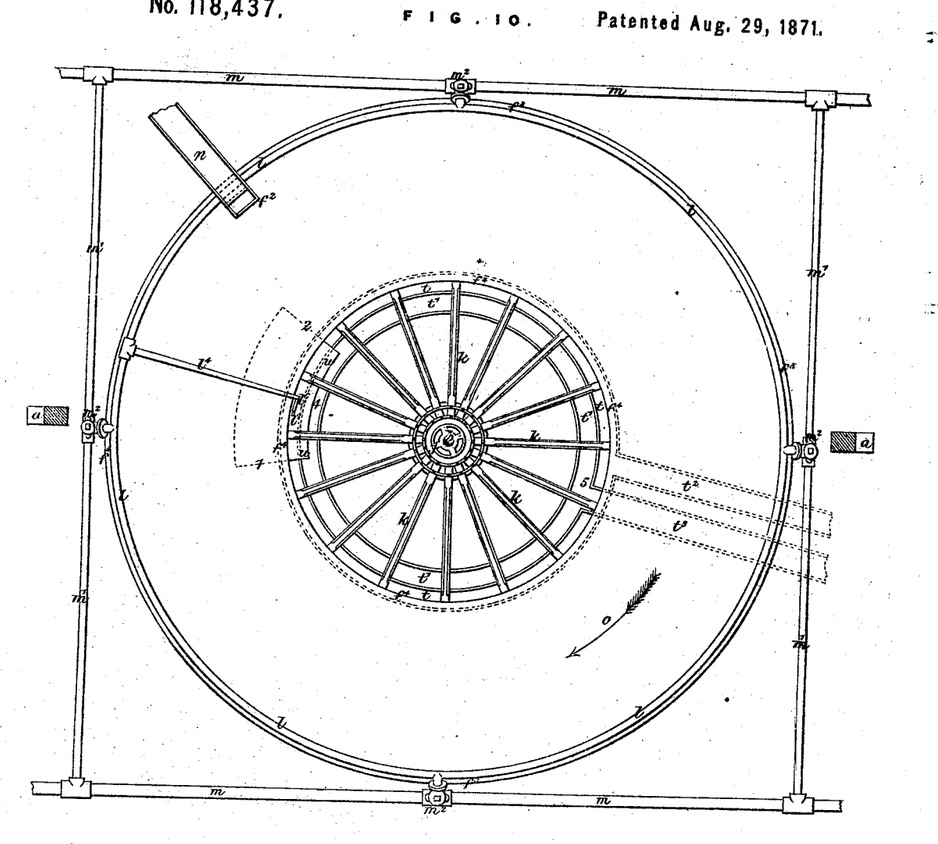
Figure 11:
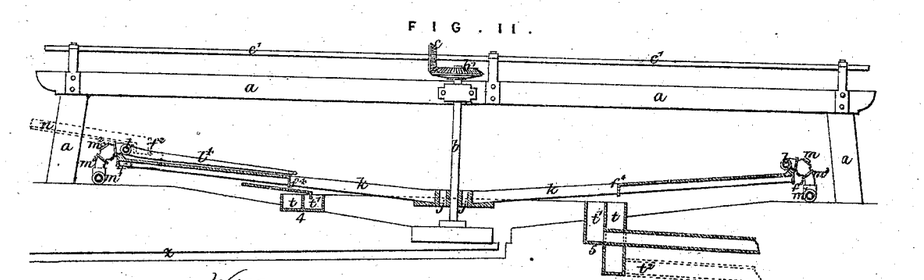

Figs. 10 and 11 show, by plan and sectional views, another modification of my invention. In this case, instead of forming the table declining from the center toward and removing the ore from the outer circumference of the inclined table, I arrange the table to decline from the outer circumference $f^3$ toward the inner circumference, and feed the ore to the table by the launder $n$ at the outer circumference $l$, and remove the ore from the inner circumference $f^4$. The circular pipe $l^0$ is arranged round the outer circumference $f^3$, and causes a constant flow of water to pass down the table for the purpose of washing or dressing the ore deposited by the launder or chute $n$. The ore is washed off by means of a pipe or tube, $l^4$, as in the previous arrangement. $m\ m^1$ are service-pipes receiving water from the mains $m$ for the supply of water to the apparatus by means of the upright pipes or tubes $m^3$. The circular pipe $l$ is supported by means of the upright pipes $m^3$, which are bent over so as to be out of the way of the revolving table $f$. $t\ t$ is a pair of receivers or hutches arranged round and below the inner circumference $f^4$ of the table $f$. The hutch or receiver $t$ receives the water and the refuse or tailings from the whole circumference of the table except that part from 1 to 2, where it is covered by a shield, $u$. The object of the shield $u$ is to prevent the ore, after being washed or dressed, from passing into the receiver or hutch $t$ and to conduct it into the receiver or hutch $t'$. $l^2\ l^3$ are chutes to carry off the water and matters from the receivers or hutches $t\ t$. It will be seen that the receivers or hutches $t\ t'$ are found inclined from the point 4 to the point 5, and the shoot $l^3$ from the receiver or hutch $l^1$ passes through the receiver $t$.

A side view of the launder or shoot $n$ is shown in dotted lines in Fig. 11.

Figure 12:
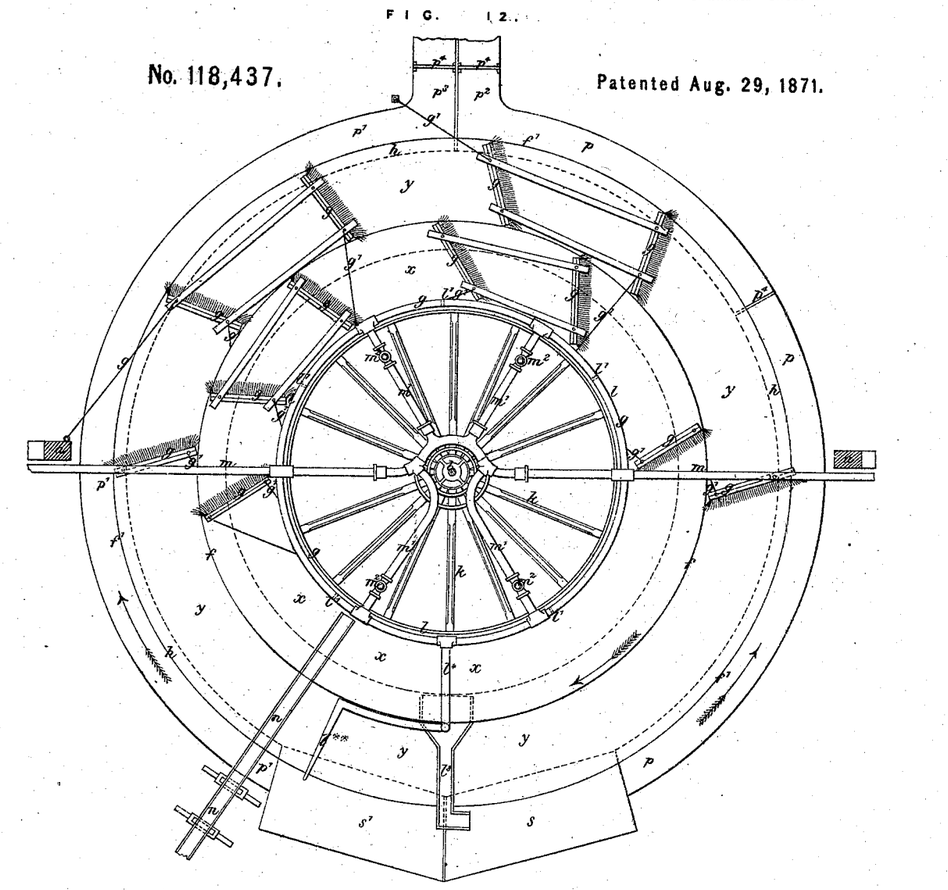
Figure 13:
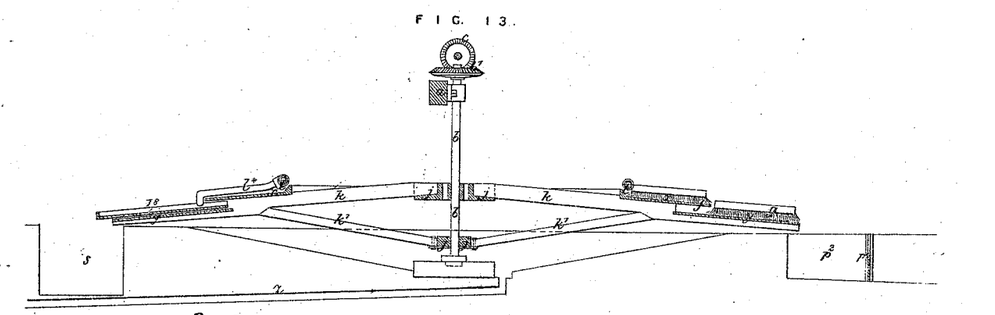

Figs. 12 and 13 show, by plan and sectional views, another modification of my invention, in which the surface of the tables $f$, instead of being in one plane, is divided into two parts, $x$ and $y$, the part $x$ being arranged at one angle while the other, $y$, is arranged at another angle, and the pipe $l^*$, employed for the purpose of washing off the ore, is bent so as to serve the purpose of the two pipes $l^4\ l^5$, shown in Figs. 1 to 7. In this case the "head" or ore on the upper portion $x$ of the table $f$ is washed off first into the launder or chute $l^8$, and is carried thereby into the receiver S, while the ore on the lower portion $y$ of the table $f$, and consequently that of least value, is washed off by the lower portion $l^{***}$ of the pipe $l^*$ into the receiver S'. The water and the refuse or tailings will be washed into the receivers or hutches $p$ or $p^1$, as in Figs. 1 to 7. Fig. 13* shows a detail view of this arrangement.

Figure 14:
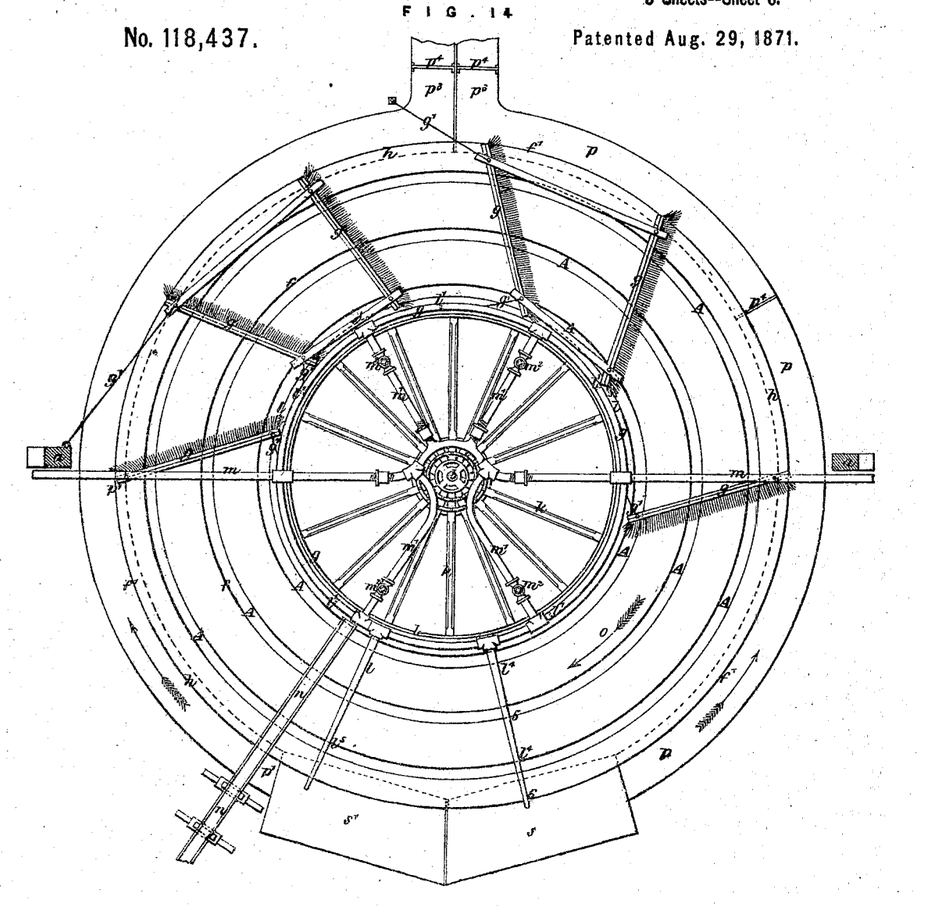
Figure 15:
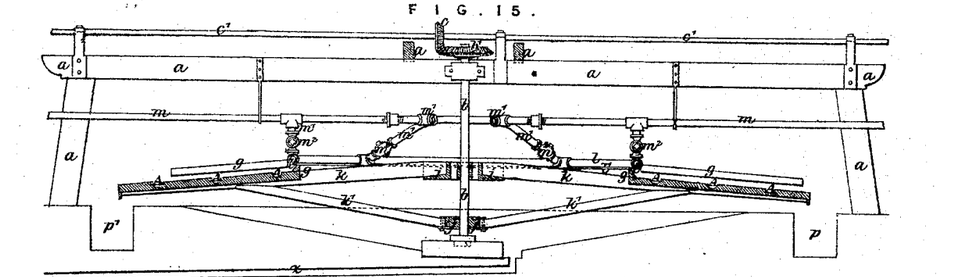

Figs. 14 and 15 show, by plan and sectional views, an arrangement of apparatus particularly applicable to washing, cleansing, or recovering gold and silver from other matters. In this arrangement a single table is employed similar in every respect to that shown in Figs. 1 to 7, except that in this case I form grooves $a$ in the table $f$ for the reception of mercury to absorb and retain the metal.

I do not claim, broadly, an ore-concentrator or washer having one or more inclined revolving tables, with a guttered table, brushes, or pads, receiving-trough and chutes for feeding ore and water therein, for such are not new; but

Having thus described my invention, what I claim as new, and desire to secure by Letters Patent, is—

1. The machine for cleansing and dressing ores, constructed and arranged to operate substantially as herein shown and described.

2. The combination of the inclined table $f$, perforated circular pipe $l$ with stops $l^1\ l^1$, connecting-pipes $m\ m$, perforated pipes $l^4\ l^5$, receivers S S', brushes $g\ g$, and receivers $p\ p^1$, constructed and operating substantially as set forth.

Witnesses:             C. F. COLLOM.
  WM. COLBORNE BROOKES,
    20 *King's Road, Bedford Row,*
                          *London, England.*
  W. C. FRIEND,
    72 *Gloucester street, London, S. W.*